US011236259B2

(12) United States Patent
Kitada et al.

(10) Patent No.: US 11,236,259 B2
(45) Date of Patent: Feb. 1, 2022

(54) THERMALLY CONDUCTIVE COMPOSITION

(71) Applicant: SEKISUI POLYMATECH CO., LTD., Saitama (JP)

(72) Inventors: Gaku Kitada, Saitama (JP); Keita Ishida, Land Nordrhein Westfalen (DE)

(73) Assignee: SEKISUI POLYMATECH CO., LTD., Saitama (JP)

( * ) Notice: Subject to any disclaimer, the term of this patent is extended or adjusted under 35 U.S.C. 154(b) by 0 days.

(21) Appl. No.: 16/768,193

(22) PCT Filed: Dec. 3, 2018

(86) PCT No.: PCT/JP2018/044405
§ 371 (c)(1),
(2) Date: May 29, 2020

(87) PCT Pub. No.: WO2019/111852
PCT Pub. Date: Jun. 13, 2019

(65) Prior Publication Data
US 2020/0291283 A1 Sep. 17, 2020

(30) Foreign Application Priority Data

Dec. 4, 2017 (JP) .............................. JP2017-232652

(51) Int. Cl.
*C09K 5/14* (2006.01)
*C08K 3/08* (2006.01)
*C08K 3/22* (2006.01)
*C08L 83/00* (2006.01)
*C08K 3/10* (2018.01)
*C08K 3/14* (2006.01)
*C08K 3/18* (2006.01)
*C08K 3/20* (2006.01)
*C08K 3/34* (2006.01)
*C08K 13/00* (2006.01)

(52) U.S. Cl.
CPC ................. *C09K 5/14* (2013.01); *C08K 3/08* (2013.01); *C08K 3/10* (2013.01); *C08K 3/14* (2013.01); *C08K 3/18* (2013.01); *C08K 3/20* (2013.01); *C08K 3/22* (2013.01); *C08K 3/34* (2013.01); *C08K 13/00* (2013.01); *C08L 83/00* (2013.01); C08K 2003/0812 (2013.01); C08K 2003/2227 (2013.01); C08K 2201/001 (2013.01); C08K 2201/005 (2013.01)

(58) Field of Classification Search
CPC .......... C09K 5/14; C08L 83/00; C08L 83/04; C08K 3/08; C08K 3/10; C08K 3/14; C08K 3/18; C08K 3/20; C08K 3/22; C08K 3/34; C08K 3/38; C08K 13/00; C08K 2003/222; C08K 2003/2227; C08K 2003/2296; C08K 2003/382; C08K 2001/001; C08K 2201/003
See application file for complete search history.

(56) References Cited

U.S. PATENT DOCUMENTS

| | | | |
|---|---|---|---|
| 6,284,817 B1 * | 9/2001 | Cross | C08K 3/08 523/220 |
| 6,884,314 B2 * | 4/2005 | Cross | C08L 83/04 156/329 |
| 9,777,205 B2 * | 10/2017 | Yang | C09K 5/10 |
| 10,297,741 B1 * | 5/2019 | Benedict | C08L 25/08 |
| 2002/0022127 A1 | 2/2002 | Katsuda et al. | |
| 2009/0152491 A1 * | 6/2009 | Saga | C08K 9/04 252/74 |
| 2010/0119798 A1 * | 5/2010 | Kirschbaum | C08F 265/04 428/220 |
| 2010/0124657 A1 | 5/2010 | Hirano | |
| 2011/0159296 A1 | 6/2011 | Maenaka et al. | |
| 2015/0299550 A1 * | 10/2015 | Kusunoki | C09K 5/14 252/75 |
| 2016/0312097 A1 * | 10/2016 | Kitada | C08L 101/00 |
| 2017/0029595 A1 * | 2/2017 | Schibur | A47K 3/40 |

FOREIGN PATENT DOCUMENTS

| | | | |
|---|---|---|---|
| CN | 102124066 | 7/2011 | |
| CN | 102618036 | 8/2012 | |
| EP | 0939115 A1 * | 9/1999 | .......... C10M 169/02 |
| JP | 11-246884 | 9/1999 | |
| JP | 2000-1616 | 1/2000 | |
| JP | 2002-47009 | 2/2002 | |
| JP | 2002-121393 | 4/2002 | |
| JP | 2010-120980 | 6/2010 | |
| JP | 2011-89079 | 5/2011 | |
| JP | 2011-144234 | 7/2011 | |
| JP | 2011-178894 | 9/2011 | |
| JP | 2012-7057 | 1/2012 | |
| JP | 2014-74331 | 4/2014 | |
| JP | 2014-84331 | 5/2014 | |
| JP | 2018-35350 | 3/2018 | |
| WO | 2013/100174 | 7/2013 | |
| WO | 2017/203924 | 11/2017 | |

OTHER PUBLICATIONS

International Search Report (ISR) dated Feb. 19, 2019 in International (PCT) Application No. PCT/JP2018/044405.
Office Action dated Mar. 1, 2021 in corresponding Chinese Patent Application No. 201880077884.7, with English Translation.
"Polymer Modification (2nd Edition)", Kingdome Encyclopedia, p. 83, China Light Indusuy Press, May 31, 2008.

* cited by examiner

Primary Examiner — Jane L Stanley
(74) Attorney, Agent, or Firm — Wenderoth, Lind & Ponack, L.L.P.

(57) ABSTRACT

The thermally conductive composition comprises a thermally conductive filler dispersed in a liquid matrix.

8 Claims, 1 Drawing Sheet

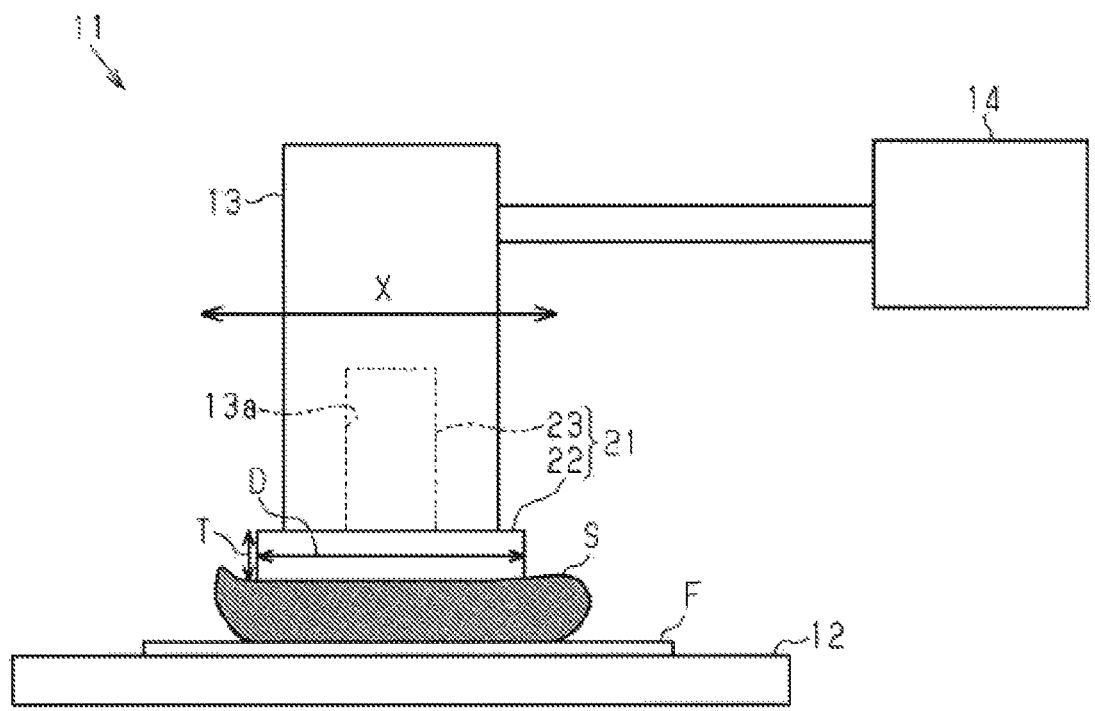

THERMALLY CONDUCTIVE COMPOSITION

TECHNICAL FIELD

The present invention relates to a thermally conductive composition.

BACKGROUND ART

As thermally conductive compositions, those comprising a plurality of alumina powders (aluminum oxide powders) different in average particle diameter are conventionally known (Patent Literatures 1 and 2). Moreover, a thermally conductive composition comprising a plurality of aluminum hydroxide powders different in average particle diameter is known (Patent Literature 3).

CITATION LIST

Patent Literature

PTL1: JP 2000-001616 A
PTL2: JP 2012-007057 A
PTL3: JP 2011-089079 A

SUMMARY OF INVENTION

Technical Problem

Since the alumina powders contained in the thermally conductive compositions described in Patent Literatures 1 and 2 are extremely hard materials, and this is a cause of accelerating abrasion of equipment such as discharge equipment for discharging a thermally conductive composition. In this regard, the aluminum hydroxide powder disclosed in Patent Literature 3 is softer than the aluminum powder, but there is yet room for improvement in view of suppressing abrasion of equipment.

It is an object of the present invention to provide a thermally conductive composition capable of suppressing abrasion of equipment.

Solution to Problem

In order to achieve the above object, an embodiment of the present invention is a thermally conductive composition comprising a thermally conductive filler dispersed in a liquid matrix, wherein a volume-based median diameter of the thermally conductive filler is 0.5 to 100 μm, a content of the thermally conductive filler in the thermally conductive composition is 50 to 95 vol %, the thermally conductive filler comprises a first thermally conductive filler having a Mohs hardness of 3 or more and a second thermally conductive filler having a Mohs hardness of less than 3, in the first thermally conductive filler in the thermally conductive composition, a content of the first thermally conductive filler that has a Mohs hardness of 4 or more and a particle diameter of 10 μm or more is less than 3 vol % based on the whole thermally conductive filler, and in the first thermally conductive filler in the thermally conductive composition, a content of the first thermally conductive filler that has a Mohs hardness of 3 or more and a particle diameter of 30 μm or more is less than 3 vol % based on the whole thermally conductive filler.

Advantageous Effect of Invention

According to the present invention, abrasion of equipment can be suppressed.

BRIEF DESCRIPTION OF DRAWING

FIG. 1 is a schematic front view showing an abrasion tester.

DESCRIPTION OF EMBODIMENT

An embodiment of the thermally conductive composition will be described hereinafter.

The thermally conductive composition comprises a thermally conductive filler dispersed in a liquid matrix. A volume-based median diameter (D50) of the thermally conductive filler is 0.5 to 100 μm. A content of the thermally conductive filler in the thermally conductive composition is 50 to 95 vol %.

The thermally conductive filler comprises a first thermally conductive filler having a Mohs hardness of 3 or more and a second thermally conductive filler having a Mohs hardness of less than 3. That is to say, in the thermally conductive composition, a first thermally conductive filler having a Mohs hardness of 3 or more and a second thermally conductive filler having a Mohs hardness of less than 3 are contained.

In the first thermally conductive filler in the thermally conductive composition, a content of the first thermally conductive filler that has a Mohs hardness of 4 or more and a particle diameter of 10 μm or more is less than 3 vol % based on the whole thermally conductive filler.

In the first thermally conductive filler in the thermally conductive composition, a content of the first thermally conductive filler that has a Mohs hardness of 3 or more and a particle diameter of 30 μm or more is less than 3 vol % based on the whole thermally conductive filler.

The particle diameter and the median diameter (D50) of the thermally conductive filler can be determined by using a scanning electron microscope (SEM). More specifically, the thermally conductive filler remaining after separation of the matrix from the thermally conductive composition or its cured product through filtration, washing or dissolution is observed in an arbitrary field of view of the scanning electron microscope. In this case, when the matrix is, for example, a silicone rubber, the thermally conductive filler can be separated by dissolving the silicone rubber using a silicone dissolving agent. In the observation, sizes of 300 thermally conductive filler particles in the field of view are measured, and from the volume-based frequency distribution, a median diameter (D50) can be estimated. Regarding the cured product of the thermally conductive composition, measurement can also be carried out in the same manner.

Regarding the size to be measured, a diameter is measured in the case of a spherical particle. In the case of a particle having an aspect ratio, such as an elliptical or amorphous particle, a length in the major axis direction and a length in the direction perpendicular to the major axis are measured, and an average value thereof is taken as a size of the particle.

When it is difficult to carry out filtration, washing or dissolution, the thermally conductive filler dispersed in the matrix may be directly observed.

The arbitrary field of view means a resolution at which the size of the thermally conductive filler contained in the thermally conductive composition can be measured, and when 300 particles cannot be observed in a single field of view, they are observed in a plurality of fields of view.

The median diameter (D50) of the thermally conductive filler referred to herein is a median diameter of the whole thermally conductive filler contained in the thermally conductive composition. Since the median diameter (D50) of the thermally conductive filler is 0.5 to 100 µm, a thermally conductive composition capable of suppressing abrasion of equipment can be obtained. The median diameter (D50) is preferably 10 to 50 µm, more preferably 31 to 40 µm.

The Mohs hardness of the thermally conductive filler is a hardness expressed based on reference minerals of 10 levels of 1 to 10, and can be measured by a commercially available Mohs scale of hardness. A larger numerical value of the Mohs hardness means harder.

Examples of materials (compositions) of the first thermally conductive filler include alumina (Mohs hardness: 9, specific gravity: 3.94, thermal conductivity: 20 to 36 W/m·K), aluminum hydroxide (Mohs hardness: 3, specific gravity: 2.42, thermal conductivity: 20 W/m·K), magnesium oxide (Mohs hardness: 4 to 6, specific gravity: 3.65, thermal conductivity: 45 to 60 W/m·K), zinc oxide (Mohs hardness: 4 to 5, specific gravity: 5.5 to 5.7, thermal conductivity: 25 W/m·K), aluminum nitride (Mohs hardness: 8, specific gravity: 3.4, thermal conductivity: 285 W/m·K), silicon carbide (Mohs hardness: 9, specific gravity: 3.16, thermal conductivity: 100 to 350 W/m·K), and crystalline silica (Mohs hardness: 7, specific gravity: 2.65, thermal conductivity: 10 W/m·K).

Examples of materials (compositions) of the second thermally conductive filler include aluminum (Mohs hardness: 2 to 2.9, specific gravity: 2.7, thermal conductivity: 250 W/m·K), boron nitride (Mohs hardness: 2, specific gravity: 2 to 3, thermal conductivity: 30 to 50 W/m·K), and graphitized carbon (Mohs hardness: 0.5 to 1, specific gravity: 2.2, thermal conductivity: 50 to 500 W/m·K).

Typical examples of the materials of the thermally conductive fillers are described, but the materials do not need to be particularly restricted thereto.

Examples of the shapes of the thermally conductive fillers include spherical, fragmented, flaky and amorphous shapes.

The thermal conductivity of the materials of the thermally conductive fillers is preferably 10 W/m·K or more. The thermal conductivity is more preferably 20 W/m·K or more.

As the first thermally conductive filler, one type may be used alone, or two or more types different in median diameter or material may be used. Also, as the second thermally conductive filler, one type may be used, or two or more types different in median diameter or material may be used. Since the Mohs hardness of the second thermally conductive filler is less than 3, the influence on the increase in abrasion loss is extremely small, and therefore, it is unnecessary to restrict the particle size and the content.

The material of the first thermally conductive filler is preferably at least one selected from the group consisting of alumina, aluminum hydroxide, aluminum nitride, silicon carbide, magnesium oxide, zinc oxide and crystalline silica. The material of the second thermally conductive filler is preferably at least one selected from the group consisting of aluminum, boron nitride and graphitized carbon.

Although the method for analysis of the thermally conductive filler, such as qualitative analysis or quantitative analysis, is not particularly restricted, energy dispersive X-ray analysis (EDX) can be used therefor, and it is preferable to use differential scanning calorimetry (DSC) or X-ray fluorescence analysis (XRF) in combination, when needed.

For example, the contents of the first thermally conductive filler and the second thermally conductive filler having a prescribed particle diameter can be analyzed by a method using an apparatus (SEM/EDX) in which a scanning microscope (SEM) and energy dispersive X-ray analysis (EDX) are united. Specifically, a thermally conductive filler for analysis is prepared similarly to the method for estimating the median diameter. In this case, from the weight of the thermally conductive composition or its cured product before separation and the weight of the thermally conductive filler separated, a content of the thermally conductive filler can be calculated. Thereafter, when thermally conductive particles are observed using a scanning microscope, the material (composition) and the size of the thermally conductive filler are recorded at the same time using energy dispersive X-ray analysis (EDX) in combination, whereby the ratios, the compositions and the particle size distributions of the first thermally conductive filler and the second thermally conductive filler can be estimated. From the content and the particle size distribution of these particles, the contents (vol %) of the first thermally conductive filler and the second thermally conductive filler having a prescribed particle diameter can be estimated.

At least a part of the thermally conductive filler may have been subjected to surface treatment. For example, when the thermally conductive filler inhibits curing reaction of the matrix, it is effective to use a thermally conductive filler having been subjected to surface treatment.

For the surface treatment of the thermally conductive filler, for example, an alkyl silane compound having a hydrolyzable group can be used. The alkyl silane compound having a hydrolyzable group is an organosilicon compound in which an alkyl group and a hydrolyzable group are bonded to one silicon atom. Examples of the alkyl groups of the alkyl silane compound having a hydrolyzable group include straight-chain alkyl groups having 1 to 16 carbon atoms, such as methyl group, ethyl group, propyl group and butyl group. Examples of the alkyl groups other than the straight-chain alkyl groups include isopropyl group, isobutyl group and phenyl group. Examples of the hydrolyzable groups include methoxy group, ethoxy group and hydroxyl group. The alkyl silane compound having a hydrolyzable group may have substituents, such as glycidyl ether group, vinyl group and acryloyl group. As the surface treatment of the thermally conductive filler, organic fatty acid treatment or silica coat can also be used.

The liquid matrix is a curable matrix that is cured by reaction. In view of storage stability, addition reaction-curable silicone can be preferably used as the liquid matrix. The addition reaction-curable silicone is two-pack type silicone, and reactive two liquids can be separately stored. The addition reaction-curable silicone has a main agent containing alkenyl group-containing organopolysiloxane and a curing agent containing organohydrogen polysiloxane having a silicon atom-bonded hydrogen atom. The addition reaction-curable silicone forms an elastic body having been cured through addition reaction of the main agent and the curing agent in the presence of a platinum catalyst.

Examples of the liquid matrixes other than the addition reaction-curable silicone include moisture-curable silicone, a matrix of radical curing reaction type due to an organic peroxide, a matrix of condensation reaction type, and a matrix of ultraviolet- or electron beam-curable type. That is to say, a curable resin material other than the liquid silicone can also be used as the liquid matrix.

In the thermally conductive composition, additives can also be contained when needed, in addition to the matrix and the thermally conductive filler. Examples of the additives include a dispersant, a fire retardant, a plasticizer, a curing retarder, an antioxidant, a colorant, a catalyst and an anti-settling agent.

In view of exhibition of higher thermal conductivity, the filling ratio of the thermally conductive filler in the thermally conductive composition is 50 vol % or more, preferably 60 vol % or more, more preferably 65 vol % or more. In view of securing fluidity of the thermally conductive composition, the filling ratio of the thermally conductive filler in the thermally conductive composition is 95 vol % or less, preferably 90 vol % or less, more preferably 85 vol % or less.

In view of suppression of weight increase of an application object to which the thermally conductive composition is applied, the density of the thermally conductive composition is preferably 2.5 kg/L or less. The lower limit of the density of the thermally conductive composition is preferably 2.0 kg/L.

The thermally conductive composition has such fluidity as the composition is dischargeable from discharge equipment. The viscosity of the thermally conductive composition at 25° C. is preferably in the range of 10 to 800 Pa·s. The viscosity of the thermally conductive composition tends to increase as the content of the thermally conductive filler increases. On this account, by increasing the content of the thermally conductive filler in such a manner that the viscosity of the thermally conductive composition becomes 10 Pa·s or more, sufficient thermal conductivity is easily exhibited.

When the viscosity of the thermally conductive composition is 800 Pa·s or less, a burden of the discharge equipment for discharging the thermally conductive composition can be reduced, or the thermally conductive composition can be stably discharged from the discharge equipment. From the viewpoints of enhancement of thermal conductivity and stable discharge of the thermally conductive composition from the discharge equipment, the viscosity of the thermally conductive composition is more preferably in the range of 150 to 600 Pa·s. Here, the viscosity indicates a viscosity as measured by a commercially available viscometer at 25° C. setting a rotation speed to 10 rpm. Also, in the case where the viscosity is measured by a commercially available viscometer at 25° C. setting a rotation speed to 5 rpm, the viscosity is more preferably in the above range.

The thermally conductive composition can suppress abrasion of equipment such as discharge equipment. The effect of the thermally conductive composition to suppress abrasion of equipment can be expressed by an abrasion loss measured by the following abrasion test.

The abrasion test is a test in which an abrasion loss of the jig is measured using an aluminum jig having a circular sliding contact surface with a diameter of 25 mm. In the abrasion test, a sliding surface of the jig is brought into sliding contact with the thermally conductive composition under the conditions of a load of 2 kg, a reciprocating motion frequency of 0.9 Hz, a reciprocating motion stroke length of 25 mm and the number of reciprocating motion times of 1500, and an abrasion loss of the jig at this time is calculated. In this abrasion test, use of a jig made of aluminum, which is relatively soft among metals, enables evaluate an abrasion loss in a test of a relatively short period of time. The abrasion test is carried out in an atmosphere of 25° C. From the abrasion test result thus obtained, abrasion property against other metals than aluminum (e.g., iron, stainless steel) can also be estimated.

In the above abrasion test for the thermally conductive composition of the present embodiment, the abrasion loss of the jig is preferably less than 3 mg, more preferably 2 mg or less.

In view of exhibition of high thermal conductivity, the thermal conductivity of a thermally conductive elastic body obtained by curing the thermally conductive composition is preferably 3 W/m·K or more. The thermal conductivity can be measured in accordance with ASTM D5470. The thermal conductivity of an uncured thermally conductive composition is also preferably 3 W/m·K or more.

The hardness of a thermally conductive elastic body obtained by curing the thermally conductive composition is preferably in the range of 10 to 60, more preferably 15 to 40, still more preferably 18 to 30, in terms of Type E hardness in accordance with JIS K6253. In this case, adhesion of the thermally conductive elastic body to, for example, a heat generating part or a heat dissipating part is improved.

The thermally conductive composition can be prepared by using well-known stirring equipment. The thermally conductive elastic body can be obtained by applying the thermally conductive composition to a prescribed part using well-known discharge equipment and then curing the composition. Examples of the discharge equipment that can be used include screw-type discharge equipment including a nozzle and a screw for extruding the thermally conductive composition to the nozzle and piston-type discharge equipment including a nozzle and a piston for extruding the thermally conductive composition to the nozzle. The thermally conductive composition applied to the application object can be cured according to the curing conditions of the matrix.

Examples of applications of the thermally conductive composition include electronic part applications, automobile (battery, etc.) applications and building applications.

Next, the action of the thermally conductive composition will be described.

As the Mohs hardness of the thermally conductive filler in the thermally conductive composition increases, the abrasion loss of equipment such as discharge equipment tends to be increased. Moreover, as the particle diameter of the thermally conductive filler in the thermally conductive composition increases, the abrasion loss of equipment such as discharge equipment tends to be increased.

In the thermally conductive composition of the present embodiment, the first thermally conductive filler and the second thermally conductive filler are contained as described above, and therefore, the abrasion loss of equipment such as discharge equipment can be reduced.

Here, from the viewpoints of reduction of abrasion loss and thermal conductivity, the volume-based mixing ratio of the first thermally conductive filler to the second thermally conductive filler (first thermally conductive filler/second thermally conductive filler) is preferably 0.3 to 1.0, more preferably 0.4 to 0.9.

In the thermally conductive elastic body obtained by curing the thermally conductive composition, thermal resistance is decreased by the first thermally conductive filler and the second thermally conductive filler, and therefore, high thermal conductivity is exhibited.

When only a thermally conductive filler having a relatively small particle diameter is used as the thermally conductive filler to be contained in the thermally conductive composition, the viscosity of the thermally conductive composition excessively increases. This may cause, for example, clogging of a nozzle of discharge equipment, so that such a composition is unsuitable for applications (uses) in which the composition is discharged using discharge equipment. In the thermally conductive composition of the present embodiment, the second thermally conductive filler having a relatively large particle diameter is contained, whereby a thermally conductive composition suitable for being discharged from discharge equipment can be obtained.

Specifically, a ratio of a median diameter X of the second thermally conductive filler (second thermally conductive filler that has the largest median diameter in the case where a plurality of fillers are contained) to a median diameter Y of the first thermally conductive filler (first thermally conductive filler that has the smallest median diameter in the case where a plurality of fillers are contained), i.e., X/Y is preferably 3 to 200, more preferably 5 to 100. Since the second thermally conductive filler having a relatively large particle diameter is contained in such a ratio, dischargeability can be particularly enhanced.

Further, a ratio of a median diameter X of the second thermally conductive filler (second thermally conductive filler that has the largest median diameter in the case where a plurality of fillers are contained) to a median diameter Y of the first thermally conductive filler (first thermally conductive filler that has the largest median diameter in the case where a plurality of fillers are contained), i.e., X/Y is preferably 2 to 30, more preferably 3 to 20. Since the second thermally conductive filler having a relatively large particle diameter is contained in such a ratio, thermal conductivity is also easily enhanced while dischargeability is enhanced.

According to the embodiment described in detail hereinbefore, such effects as below are obtained.

(1) The thermally conductive filler in the thermally conductive composition of the present embodiment comprises the first thermally conductive filler having a Mohs hardness of 3 or more and the second thermally conductive filler having a Mohs hardness of less than 3. In the first thermally conductive filler in the thermally conductive composition, a content of the first thermally conductive filler that has a Mohs hardness of 4 or more and a particle diameter of 10 μm or more is less than 3 vol % based on the whole thermally conductive filler. In the first thermally conductive filler in the thermally conductive composition, a content of the first thermally conductive filler that has a Mohs hardness of 3 or more and a particle diameter of 30 μm or more is less than 3 vol % based on the whole thermally conductive filler. According to this constitution, abrasion of equipment can be suppressed. On this account, it becomes possible to reduce expenses required for measures to enhance durability of equipment or expenses required for maintenance of equipment such as replacement of pipes of flow passages.

Here, in the first thermally conductive filler in the thermally conductive composition, the content of the first thermally conductive filler that has a Mohs hardness of 4 or more and a particle diameter of 10 μm or more is preferably 2 vol % or less of the whole thermally conductive filler.

In the first thermally conductive filler in the thermally conductive composition, the content of the first thermally conductive filler that has a Mohs hardness of 3 or more and a particle diameter of 30 μm or more is preferably 2.5 vol % or less of the whole thermally conductive filler.

In the first thermally conductive filler in the thermally conductive composition, the total of the content of the first thermally conductive filler that has a Mohs hardness of 4 or more and a particle diameter of 10 μm or more and the content of the first thermally conductive filler that has a Mohs hardness of 3 or more and a particle diameter of 30 μm or more is preferably 1 to 3 vol %, more preferably 1.5 to 2.8 vol % based on the whole thermally conductive filler in view of reduction of abrasion loss and thermal conductivity.

(2) The material of the first thermally conductive filler is preferably at least one selected from the group consisting of alumina, aluminum hydroxide, aluminum nitride, silicon carbide, magnesium oxide, zinc oxide and crystalline silica, and the material of the second thermally conductive filler is preferably at least one selected from the group consisting of aluminum, boron nitride and graphitized carbon.

In this case, a thermally conductive composition having a relatively low density and exhibiting high thermal conductivity can be obtained.

(3) The matrix contained in the thermally conductive composition is preferably addition reaction-curable silicone.

In this case, by separately storing a first agent containing the addition reaction-curable silicon as a main agent and a second agent containing the addition reaction-curable silicone as a curing agent, long-term storage stability of the thermally conductive composition can be obtained. The thermally conductive composition can be used as a mixture obtained by mixing the first agent and the second agent using well-known mixing equipment.

(4) The density of the thermally conductive composition is preferably 2.5 kg/L or less.

In this case, weight increase of an application object to which the thermally conductive composition is applied can be suppressed. Here, in order to sufficiently dissipate heat around electrical equipment (battery, etc.) of an automobile such as EV (Electric Vehicle) or PHV (Plug-in Hybrid Vehicle), it is necessary to apply a relatively large amount (several liters per automobile) of a thermally conductive composition. In this regard, when the thermally conductive composition of the present embodiment is applied around the electrical equipment of an automobile, weight increase of the automobile can be suppressed. Accordingly, the thermally conductive composition can contribute to securing a cruising distance of an automobile.

(5) The thermal conductivity of a thermally conductive elastic body obtained by curing the thermally conductive composition is preferably 3 W/m·K or more. In this case, for example, heat around electrical equipment (battery, etc.) of an automobile can be efficiently dissipated, and therefore, it becomes possible to extend a battery life.

(6) As described above, in order to sufficiently dissipate heat around electrical equipment in an automobile such as EV, a relatively large amount of a thermally conductive composition needs to be applied. In this case, use of discharge equipment for discharging a thermally conductive composition is efficient, but with an increase in the amount of the thermally conductive composition used, influence on durability of equipment such as discharge equipment increases. By using the thermally conductive composition of the present embodiment for automobiles, abrasion of automobile manufacturing equipment can be suppressed, and in this regard, this thermally conductive composition is particularly advantageous. Specifically, expenses required for maintenance of automobile manufacturing equipment and influence on the automobile production volume caused by maintenance of the manufacturing equipment can be suppressed as much as possible.

EXAMPLES

Next, examples and comparative examples will be described.

Example 1

As shown in Table 1, in Example 1, a thermally conductive composition was prepared by mixing a thermally conductive filler and a matrix. The unit of a numerical value indicating an amount of each component used in Table 1 is vol %. As the matrix, commercially available addition reaction-curable silicone was used.

The column "First thermally conductive filler (a)" in Table 1 shows a thermally conductive filler having a Mohs hardness of 4 or more and a particle diameter of 10 μm or more.

The column "First thermally conductive filler (b)" in Table 1 shows a thermally conductive filler having a Mohs hardness of 3 or more and a particle diameter of 30 μm or more.

The contents of the first thermally conductive filler (a) and the first thermally conductive filler (b) are each a ratio of each filler to the whole thermally conductive filler, as calculated based on the particle size distribution (volume-based) of the thermally conductive filler and expressed in vol %.

Examples 2 and 3

As shown in Table 1, in Examples 2 and 3, thermally conductive compositions were prepared in the same manner as in Example 1, except that formulation of the thermally conductive filler was changed.

Comparative Examples 1 to 5

As shown in Table 2, in Comparative Examples 1 to 5, thermally conductive compositions were prepared in the same manner as in Example 1, except that formulation of the thermally conductive filler was changed.

<Density>

Density (kg/L) of the thermally conductive composition of each example was calculated. The results are set forth in Tables 1 and 2.

<Viscosity>

Using a B type viscometer (Brookfield Engineering Laboratories, Inc., rotational viscometer, DV-E), viscosity of the thermally conductive composition of each example immediately after preparation was measured. The viscosity measuring temperature was 25° C., and the measurement was carried out under two conditions of a spindle (SC4-14) rotational speed of 5 rpm and that of 10 rpm. The results are set forth in Tables 1 and 2.

<Thermal Conductivity>

Thermal conductivity of the thermally conductive composition of each example was measured by a method in accordance with ASTM D5470.

Further, thermal conductivity of a thermally conductive elastic body (25.4×25.4 mm, thickness 1 mm) obtained by curing the thermally conductive composition of each example at 25° C. for 24 hours was measured by a method in accordance with ASTM D5470. The results are set forth in Tables 1 and 2.

<Hardness>

Hardness (E hardness) of a thermally conductive elastic body (50×50 mm, thickness 10 mm) obtained by curing the thermally conductive composition of each example at 25° C. for 24 hours was measured by a method in accordance with JIS K6253. The results are set forth in Tables 1 and 2.

<Abrasion Loss>

Using an abrasion tester 11 shown in FIG. 1, an abrasion test in which a jig 21 was brought into sliding contact with the thermally conductive composition was carried out.

The abrasion tester 11 includes a mounting table 12 having a horizontal plane, a holding part 13 for holding a jig 21, and a drive part 14 for making the holding part 13 undergo reciprocating motion in the horizontal direction. The drive part 14 includes a motor and a mechanism for converting rotational motion into reciprocating motion. On the mounting table 12, an abrasive paper F is mounted, and onto this abrasive paper F, a thermally conductive composition S is applied. The abrasive paper F has a size of a width of 50 mm and a length of 70 mm. This abrasive paper F suppresses misregistration of the thermally conductive composition S on the mounting table 12 when the holding part 13 (jig 21) is made to undergo reciprocating motion. The amount of the thermally conductive composition S applied is about 20 g.

The jig 21 is made of aluminum (A5052 alloy), and includes a disc-shaped main body 22 having a diameter D of 25 mm and a thickness T of 4.57 mm and a shaft-like attaching part 23 to be fitted into a fitting concavity 13a of the holding part 13. The lower surface of the main body 22 of the jig 21 is a sliding contact surface, and a surface roughness Ra of the sliding contact surface, as measured using VK-X 100 series manufactured by Keyence Corporation, was 1.101 μm.

In the abrasion tester 11, the holding part 13 holding the jig 21 is made to undergo reciprocating motion in the sliding direction X indicated by an arrow by the drive part 14. Owing to this, the lower surface (sliding contact surface) of the main body 22 of the jig 21 can be brought into sliding contact with the thermally conductive composition S.

In the abrasion test, first, the thermally conducive composition S was pressed down by the lower surface (sliding contact surface) of the main body 22 of the jig 21, then the abrasion tester 11 was activated under the following conditions: the load applied to the jig 21 was 2 kg, the frequency of the reciprocating motion of the jig 21 was 0.9 Hz, the stroke length of the jig 21 was 25 mm, and the number of reciprocating motion times of the jig 21 was 1500. From a difference between the mass of the jig 21 after the abrasion test and the mass of the jig 21 before the abrasion test, abrasion loss (mg) was calculated. Regarding the thermally conductive compositions S of the examples and the comparative examples, the results of the abrasion losses are set forth in Tables 1 and 2.

TABLE 1

|  |  | Median diameter (D50) [μm] | Specific gravity | Example 1 | Example 2 | Example 3 |
| --- | --- | --- | --- | --- | --- | --- |
| Thermally conductive composition (vol %) | Matrix (addition reaction-curable silicone) | — | 1 | 25 | 30 | 25 |
|  | Thermally conductive filler A1 (alumina) | 3 | 3.94 | 0 | 20 | 20 |

TABLE 1-continued

|  |  | Median diameter (D50) [μm] | Specific gravity | Example 1 | Example 2 | Example 3 |
|---|---|---|---|---|---|---|
|  | Thermally conductive filler B1 (aluminum hydroxide) | 10 | 2.4 | 30 | 0 | 15 |
|  | Thermally conductive filler C (aluminum) | 50 | 2.7 | 45 | 50 | 40 |
| Median diameter of whole thermally conductive filler contained in thermally conductive composition (D50) [μm] | | | | 33 | 40 | 31 |
| First thermally conductive filler (vol %) | First thermally conductive filler (a) | | | 0 | 1.7 | 1.6 |
|  | First thermally conductive filler (b) | | | 2.0 | 0 | 1.0 |
| Density of thermally conductive composition (kg/L) | | | | 2.2 | 2.4 | 2.5 |
| Viscosity (Pa·s) | 5 rpm | | | 600 | 420 | 380 |
|  | 10 rpm | | | 400 | 290 | 260 |
| Thermal conductivity (composition) (W/m·K): ASTM D5470 | | | | 3.2 | 3.4 | 3.6 |
| Thermal conductivity (cured product) (W/m·K): ASTM D5470 | | | | 3.1 | 3.4 | 3.7 |
| E hardness | | | | 23 | 22 | 20 |
| Abrasion loss (mg) | | | | 0.8 | 0.4 | 1 |

TABLE 2

|  |  | Median diameter (D50) [μm] | Specific gravity | Comparative Example 1 | Comparative Example 2 | Comparative Example 3 |
|---|---|---|---|---|---|---|
| Thermally conductive composition (vol %) | Matrix (addition reaction-curable silicone) | — | 1 | 25 | 35 | 30 |
|  | Thermally conductive filler A1 (alumina) | 3 | 3.94 | 15 | 20 | 0 |
|  | Thermally conductive filler A2 (alumina) | 20 | | 0 | 30 | 0 |
|  | Thermally conductive filler A3 (alumina) | 70 | | 45 | 0 | 0 |
|  | Thermally conductive filler B1 (aluminum hydroxide) | 10 | 2.4 | 15 | 15 | 35 |
|  | Thermally conductive filler B2 (aluminum hydroxide) | 50 | | 0 | 0 | 35 |
| Median diameter of whole thermally conductive filler contained in thermally conductive composition (D50) [μm] | | | | 41 | 12 | 30 |
| First thermally conductive filler (vol %) | First thermally conductive filler (a) | | | 58.1 | 35.1 | 0 |
|  | First thermally conductive filler (b) | | | 57.1 | 15.5 | 40.0 |
| Density of thermally conductive composition (kg/L) | | | | 3.0 | 2.7 | 2.0 |
| Viscosity (Pa·s) | 5 rpm | | | 650 | 200 | 400 |
|  | 10 rpm | | | 470 | 110 | 270 |
| Thermal conductivity (composition) (W/m·K): ASTM D5470 | | | | 3.1 | 2.2 | 2.1 |
| Thermal conductivity (cured product) (W/m·K): ASTM D5470 | | | | 3.0 | 2.2 | 2.0 |
| E hardness | | | | 30 | 2 | 20 |
| Abrasion loss (mg) | | | | 8.8 | 6 | 3.3 |

TABLE 3

|  |  | Median diameter (D50) [μm] | Specific gravity | Comparative Example 4 | Comparative Example 5 |
|---|---|---|---|---|---|
| Thermally conductive composition (vol %) | Matrix (addition reaction-curable silicone) | — | 1 | 30 | 25 |
|  | Thermally conductive filler A1 (alumina) | 3 | 3.94 | 20 | 15 |
|  | Thermally conductive filler A2 (alumina) | 20 | | 0 | 5 |
|  | Thermally conductive filler A3 (alumina) | 70 | | 0 | 0 |
|  | Thermally conductive filler B1 (aluminum hydroxide) | 10 | 2.4 | 40 | 0 |

TABLE 3-continued

|  | Median diameter (D50) [μm] | Specific gravity | Comparative Example 4 | Comparative Example 5 |
|---|---|---|---|---|
| Thermally conductive filler B2 (aluminum hydroxide) | 50 |  | 5 | 0 |
| Thermally conductive filler C (aluminum) | 50 | 2.7 | 10 | 55 |
| Median diameter of whole thermally conductive filler contained in thermally conductive composition (D50) [μm] |  |  | 17 | 41 |
| First thermally conductive filler (vol %) — First thermally conductive filler (a) |  |  | 1.6 | 6.0 |
| First thermally conductive filler (vol %) — First thermally conductive filler (b) |  |  | 7.7 | 2.1 |
| Density of thermally conductive composition (kg/L) |  |  | 2.3 | 2.5 |
| Viscosity (Pa·s) 5 rpm |  |  | 560 | 400 |
| Viscosity (Pa·s) 10 rpm |  |  | 360 | 290 |
| Thermal conductivity (composition) (W/m·K): ASTM D5470 |  |  | 2.1 | 3.2 |
| Thermal conductivity (cured product) (W/m·K): ASTM D5470 |  |  | 2.1 | 3.2 |
| E hardness |  |  | 15 | 20 |
| Abrasion loss (mg) |  |  | 3.1 | 5.2 |

In the case of the thermally conductive compositions of Examples 1 to 3, the abrasion losses found in the abrasion test were each less than 3 mg.

On the other hand, in each of the thermally conductive compositions of Comparative Examples 1 to 5, the content of at least one of the first thermally conductive filler (a) and the first thermally conductive filler (b) was 3 vol % or more. When the thermally conductive compositions of Comparative Examples 1 to 5 of these comparative examples were used, the abrasion losses were each 3 mg or more, and it can be seen that the thermally conductive composition of each comparative example more easily abraded equipment than the thermally conductive composition of each example. When the thermally conductive composition of Comparative Example 4 of them was used, the abrasion loss was as relatively low as 3.1 mg, but in either case of the composition and the cured product, the thermal conductivity proved to be low.

The thermally conductive composition of each example had a relatively low density of 2.5 kg/L or less, and the thermally conductive elastic body obtained from the thermally conductive composition of each example proved to exhibit a thermal conductivity of 3 W/m·K or more.

REFERENCE SIGNS LIST

S thermally conductive composition
21 jig
D diameter

The invention claimed is:

1. A thermally conductive composition comprising a thermally conductive filler dispersed in a liquid matrix, wherein
   a volume-based median diameter of the thermally conductive filler is 0.5 to 100 μm;
   a content of the thermally conductive filler in the thermally conductive composition is 50 to 95 vol %;
   the thermally conductive filler comprises a first thermally conductive filler having a Mohs hardness of 3 or more and a second thermally conductive filler having a Mohs hardness of less than 3;
   in the first thermally conductive filler in the thermally conductive composition, a content of the first thermally conductive filler that has a Mohs hardness of 4 or more and a particle diameter of 10 μm or more is 1 to 3 vol % based on the whole thermally conductive filler;
   in the first thermally conductive filler in the thermally conductive composition, a content of the first thermally conductive filler that has a Mohs hardness of 3 or more and a particle diameter of 30 μm or more is 1 to 3 vol % based on the whole thermally conductive filler;
   the viscosity of the thermally conductive composition at 25° C. is in the range of 10 to 600 Pa·s; and
   the volume based mixing ratio of the first thermally conductive filler to the second thermally conductive filler (first thermally conductive filler/second thermally conductive filler) is 0.3 to 0.9.

2. The thermally conductive composition according to claim 1, wherein
   a material of the first thermally conductive filler is at least one selected from the group consisting of alumina, aluminum hydroxide, aluminum nitride, silicon carbide, magnesium oxide, zinc oxide and crystalline silica; and
   a material of the second thermally conductive filler is at least one selected from the group consisting of aluminum, boron nitride and graphitized carbon.

3. The thermally conductive composition according to claim 1, wherein the matrix is addition reaction-curable silicone.

4. The thermally conductive composition according to claim 1, having a density of 2.5 kg/L or less.

5. The thermally conductive composition according to claim 1, wherein a thermal conductivity of a thermally conductive elastic body obtained by curing the thermally conductive composition is 3 W/m·K or more.

6. The thermally conductive composition according to claim 1, wherein in an abrasion test for thermally conductive composition using an aluminum jig having a circular sliding contact surface with a diameter of 25 mm, an abrasion loss of the jig is less than 3 mg when the sliding contact surface of the jig is brought into sliding contact with the thermally conductive composition under the conditions of a load of 2 kg, a reciprocating motion frequency of 0.9 Hz, a reciprocating motion stroke length of 25 mm and a number of reciprocating motion times of 1500.

7. The thermally conductive composition according to claim 1, wherein the viscosity of the thermally conductive composition at 25° C. is in the range of 150 to 600 Pa·s.

8. The thermally conductive composition according to claim 1, wherein the volume based mixing ratio of the first thermally conductive filler to the second thermally conductive filler (first thermally conductive filler/second thermally conductive filler) is 0.4 to 0.9.

* * * * *